(12) United States Patent
Gwynn et al.

(10) Patent No.: US 8,795,401 B2
(45) Date of Patent: Aug. 5, 2014

(54) FILTER WITH CYCLONE SEPARATION MEANS

(75) Inventors: John Edward Charles Gwynn, Barrow-in-Furness (GB); John McCallum, Leyland (GB); David Mitchell, Tarleton (GB); Michael Hogg, Leyland (GB); Maciej Adrian Zyga, Preston (GB)

(73) Assignee: Assured Performance Group (Holdings) Ltd., Lancashire (GB)

( * ) Notice: Subject to any disclaimer, the term of this patent is extended or adjusted under 35 U.S.C. 154(b) by 0 days.

(21) Appl. No.: 13/699,227

(22) PCT Filed: May 20, 2011

(86) PCT No.: PCT/GB2011/050956
§ 371 (c)(1),
(2), (4) Date: Feb. 26, 2013

(87) PCT Pub. No.: WO2011/144942
PCT Pub. Date: Nov. 24, 2011

(65) Prior Publication Data
US 2013/0145732 A1  Jun. 13, 2013

(30) Foreign Application Priority Data
May 21, 2010 (GB) .................................. 1008488.7

(51) Int. Cl.
*B01D 50/00* (2006.01)
(52) U.S. Cl.
USPC .................. 55/337; 55/345; 55/424; 55/429; 55/433; 55/353; 55/459.1; 55/486; 55/349; 55/283; 55/447; 55/434.2

(58) Field of Classification Search
CPC ..... B01D 45/16; F25B 49/00; F25B 2600/07; F25D 29/00; F24F 2011/0068
USPC ........ 55/345, 424, 429, 433, 353, 459.1, 486, 55/349, 337, 283, 447, 434.2; 165/147, 165/154; 62/56
See application file for complete search history.

(56) References Cited

U.S. PATENT DOCUMENTS 1,897,195 A   2/1933   Howden
2,768,707 A   10/1956  Campbell
(Continued)

FOREIGN PATENT DOCUMENTS

| CN | 201316679 | 9/2009 |
| FR | 2880824 | 7/2006 |
| WO | 0009242 | 2/2000 |
| WO | 2006026414 | 3/2006 |

OTHER PUBLICATIONS

Hoffman, Alexander, International Search Report for PCT/GB2011/050956, Aug. 18, 2011.

*Primary Examiner* — Jason M Greene
*Assistant Examiner* — Dung H Bui
(74) *Attorney, Agent, or Firm* — Trego, Hines & Ladenheim, PLLC (57) ABSTRACT

Disclosed in a filter for filtering a working fluid comprising a canister having an inlet and an outlet; a first partially perforated generally conical member positioned in said canister; a second generally conical member positioned inside said first partially perforated generally conical member, whereby the working fluid upon entering the inlet is caused to spin inside the canister, to pass through the perforated portion of the first generally conical member, to enter an inlet to the second generally conical member, to spin within the second conical member and to pass through the outlet.

8 Claims, 8 Drawing Sheets

(56) References Cited

U.S. PATENT DOCUMENTS

| | | | |
|---|---|---|---|
| 7,419,522 B2* | 9/2008 | Arnold | 55/345 |
| 8,444,738 B2* | 5/2013 | Kim | 55/523 |
| 2006/0045827 A1 | 3/2006 | Sprouse | |
| 2006/0207231 A1 | 9/2006 | Arnold | |

* cited by examiner

FILTER WITH CYCLONE SEPARATION MEANS

The present invention relates to an improved system for supplying compressed air to vehicle systems. Compressed air is required in a variety of different vehicles and is used for, amongst other things, braking systems.

Prior art compressed air systems comprise a compressor, which is typically driven from the engine either by a crankshaft pulley via a belt or directly from the engine timing gears. The compressor is typically lubricated and cooled by the engine lubrication and cooling systems.

Prior art compressors are generally regarded as being part of the engine system, rather than a stand-alone system and this leads to a number of compromises in their construction, installation and operation.

Figure 1:
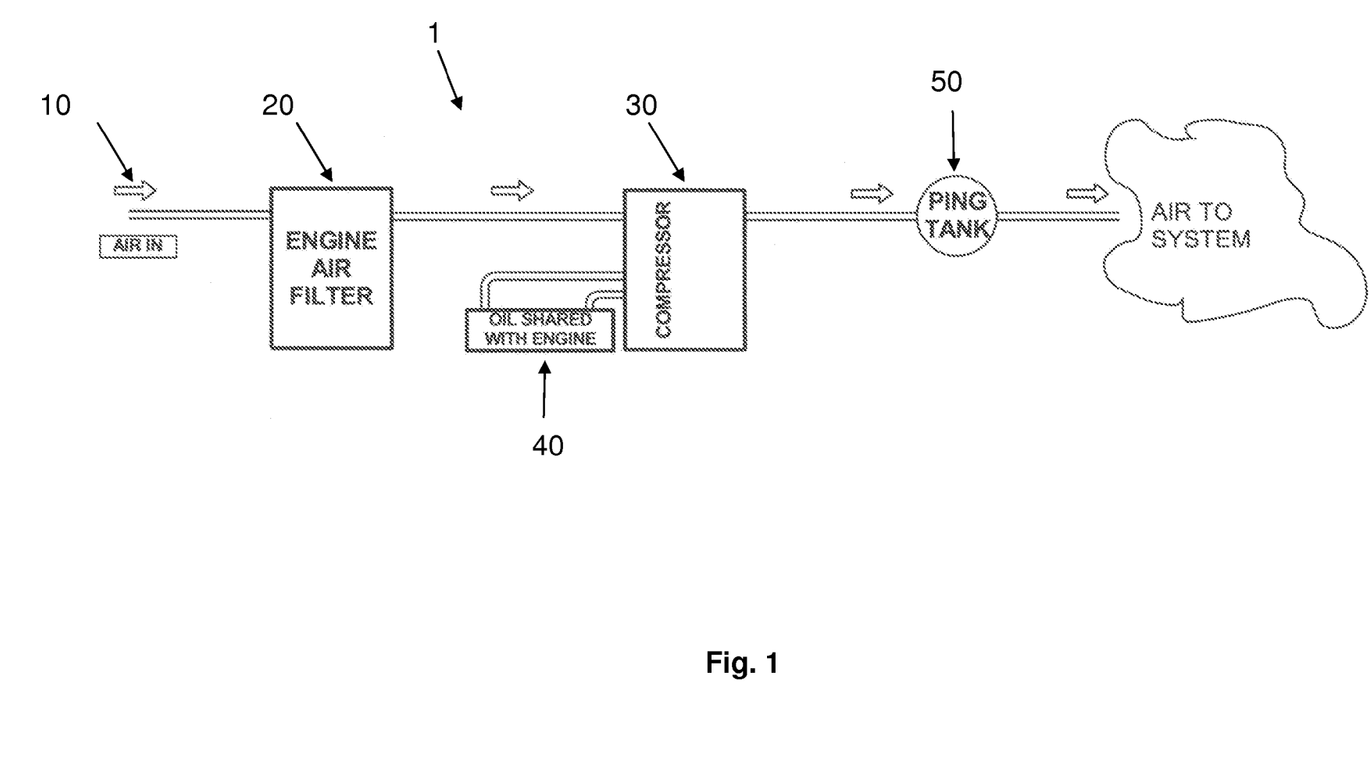
FIG. 1 shows a prior art compressed air system.

FIG. 1 shows a prior art compressed air system 1, which comprises an air inlet 10, which is filtered by the engine air filter 20. The filtered air is then fed into a compressor 30, which is lubricated by a lubrication system 40 shared with the engine. The compressed air is then passed through a lengthy system of pipes, which comprise a ping tank 50 whose purpose is to try and alleviate some problems encountered with back pressure and pressure waves in the system. Finally the compressed air may be passed through a drier (not shown) and then supplied to the vehicle system of powering brakes and other devices. The lengthy system of pipes is often provided in an attempt to cool the air before it enters the system, which is an inefficient and often ineffective technique.

It is an aim of embodiments of the present invention to address issues with the design, construction, installation and operation of vehicular compressed air systems, whether mentioned herein or not.

According to a first aspect of the present invention there is provided a filter for filtering a working fluid comprising:
 a canister having an inlet and an outlet;
 a first partially perforated generally conical member positioned in said canister;
 a second generally conical member positioned inside said first partially perforated generally conical member, whereby the working fluid upon entering the inlet is caused to spin inside the canister, to pass through the perforated portion of the first generally conical member, to enter an inlet to the second generally conical member, to spin within the second conical member and to pass through the outlet.

Preferably, the inlet to the canister is located such that the working fluid enters the canister tangentially, causing it to spin.

Preferably, the first generally conical member comprises a cylinder at its narrow end.

Preferably the narrow end of the second generally conical member is positioned inside the cylinder.

Preferably the inlet to the second generally conical member comprises a plurality of ducts.

Preferably the outlet of the canister comprises an element which extends into the second generally conical member such that working fluid entering the second generally conical member is not able to exit through the outlet immediately.

Preferably the canister is provided with a pressure valve whereby debris is purged periodically, once a given pressure is reached. Alternatively, debris may be removed by a manual process or by a semi-automated process initiated by user-control.

Preferably, the filter is cooled by a coolant.

Preferably the coolant is provided in a coolant jacket which surrounds at least part of the canister. Alternatively, an internal heat exchanger or other means of cooling may be employed.

By causing the working fluid to spin within the canister and generally conical members, debris and moisture in the working fluid is removed from the working fluid and falls to the floor of the canister for later ejection.

Throughout the description of the invention, reference has been made to compressed air, but the skilled person will realise that embodiments of the invention may be used with other fluids and so the term working fluid is used to generally denote any fluid made the subject of embodiments of the present invention.

According to a second aspect of the present invention there is provided a heat exchanger for cooling a working fluid comprising:
 an inlet connected to a first chamber, connected to a plurality of tubes, connected to a second chamber and then to an outlet, wherein the plurality of tubes are located within a further tube and surrounded by a coolant.

Preferably, the chambers are conical chambers to provide a gradual increase or decrease in tube diameter.

Preferably the coolant is pumped through the further tube to remove heat from the working fluid.

Preferably the dimensions of the heat exchanger are adapted to a particular system to incorporate the effects of a Helmholtz resonator to remove certain resonant effects in the system.

According to a third aspect of the present invention, there is provided a method of cooling a working fluid in a compressed air system utilising the combined effects of expansion condensation and surface condensation.

According to a fourth aspect of the present invention there is a system for use with a compressor for processing a compressed working fluid comprising a heat exchanger according to the second aspect and a filter according to the first aspect, wherein said heat exchanger receives working fluid from a compressor and the filter receives working fluid from the heat exchanger.

Preferably, the system further comprises an additional filter according to the first aspect to filter working fluid before it is compressed in the compressor.

Preferably, the system is provided with a cooling system.

Preferably the cooling system comprises a pumped coolant, cooled using a radiator and a fan.

Other features of the invention will be apparent from the dependent claims, and the description which follows.

For a better understanding of the invention, and to show how embodiments of the same may be carried into effect, reference will now be made, by way of example, to the accompanying diagrammatic drawings in which.

Compressed air systems, as mentioned, are used commonly on larger road vehicles, such as trucks and buses. However, the systems are typically configured for use with trucks and on buses have different operating characteristics. A typical bus journey involves far more stopping and starting than a typical truck journey, and this change in the duty cycle of operation of the compressed air system has serious deleterious effects on both its operational efficiency and longevity. Problems introduced by operating the compressed air system in an operational zone for which it was never intended, tend to result in more frequent maintenance being required and premature failure of parts of the system.

Part of the motivation for devising the present invention stems from the realisation that the compressed air system, particularly for use with buses and public service vehicles, could benefit from significant re-design to ensure that, as far as possible, it operates in a more properly defined operational zone. This thinking has led to a re-design of the entire system.

Embodiments of the present invention benefit from improvements in several areas of the system, each one of which may be considered an aspect of the invention in its own right. Further aspects of the invention derive from combinations of one or more of the individual aspects.

Embodiments of the invention may be used in conjunction with any machine that compresses a fluid. The form of compressor used is not a limiting feature of the present invention. Examples of the type of compressor which may be used include, but are not limited to reciprocating, screw, vane, axial and centrifugal types.

A basic requirement of a compressed air system is the provision of cool, dry, clean air which is free of oil. In prior art systems, it has not always been easy or indeed possible to provide each of these. This leads to the aforementioned maintenance and performance problems which can have a serious effect on the compressed air system.

In an idealised adiabatic compression, no heat is transferred to or from the working fluid but adiabatic heating takes place when the pressure of a gas is increased as a result of work done on it by its surroundings. This heating needs to be reversed, whilst maintaining pressure (which is to put the gas back to an isothermal state but at a higher pressure than before), before the compressed air can be used in a system Additionally, there are various factors inherent in the prior art systems which cause the adiabatic heating to be higher than that required to simply compress the gas. Some of these include, for example, the consequences of constrictions in the pipework due to either poor design or, more often, by the coating of the inside of the pipes with combustion residues, oil and emulsions. Other, more complex, effects are due to back-pressure, resonance and pulsing of the working fluid.

The consequences of this can be an extreme build up of temperature which can lead to the catastrophic failure of parts of the compression system. Failed prior art systems have been observed where increasing the thermal loading of the system has been to a point where catastrophic failure can occur and increased fire risk; temperatures are observed to have risen to the point where brass components have melted. In essence, the effect is worsened by the pulsing of the compressed air within the pipework which leads to complex and unpredictable pressure waves and consequential localised heating.

Embodiments of the present invention address the problems posed by the prior art by providing improved means of processing, cleaning and cooling the air. In particular, embodiments of the invention aim to improve the volumetric efficiency of the system and to address problems posed by the increased temperature of the working fluid.

As air is drawn into the compressor, and compressed in the compressor to pressures in the range 8-14 bar, water vapour present in the air is condensed due to the reducing effect of the vapour pressure of the water vapour in the air. The resulting liquid can pose problems in the pipework, leading to corrosion and can, in cold weather, freeze, causing severe problems to the operation of the compressed air system. However dry the air at the input seems, it always contains some water and its effects need to be mitigated to ensure reliable operation of the compressed air system.

Prior art compressed air systems generally include a drier component, comprising a desiccant to remove water vapour from the system. The efficacy of such components is variable and one of the major reasons for their lack of efficacy is due to the presence of oil in the pipework, which is absorbed by the desiccant, preventing it from performing its proper function of removing water. The drier component therefore requires regular replacement. Embodiments of the present invention address this problem by drying the air in the system in a way which requires no consumable components, such as desiccators, or, at least, requires them to be changed far less frequently.

The presence of oil, as a fine mist, in the compressed air poses further problems. As mentioned, prior art systems can experience very high temperatures and this can lead to the combustion of the oil mist, resulting in particulate carbon and other combustion products, which become suspended in the air stream. The carbon, in particular, becomes sticky when wetted with oil, particularly oil which has been raised to temperatures that force evaporation or partial combustion of the higher fractions, and adheres to the interior of the pipework, reducing the effective diameter and obstructing the flow. This results in an increased pressure loss, requiring still higher pressures from the compressor which, in turn, increases the temperature even further. The insulating effect of the oil/carbon mix on the internal surface of the pipework also has the effect of insulating the pipework and reducing the effective heat loss from the external surface of the pipes. Additionally, partial or complete combustion, at least by flashing, causes hard carbon to precipitate and collect on surfaces, causing impenetrable obstructions. Prior art systems often rely on this heat loss as the only way of cooling the system, and when this mechanism is impeded, then extreme temperature rises may be observed.

In prior art systems, rather than attempting to address the problem of high temperatures at the source, the effects are mitigated through the use of excessive lengths of piping to provide a greater cooling surface. However, this approach is flawed since the increased length of piping is, itself, resistant to the flow of air, even without the internal build up of deposits on the pipework. When carbon does build up on the pipes, it acts as an insulator. The carbon further increases back pressure and increases the friction. External contamination off the pipes, from dirt, mud, debris and oil acts as a further insulator.

Embodiments of the invention address these problems in several ways, each of which is intended to address a given problem at source, rather than attempting to deal with it by addressing the symptoms. This approach offers a more sustainable system, operating within efficient parameters, resulting is a more reliable and efficient system.

Figure 2:
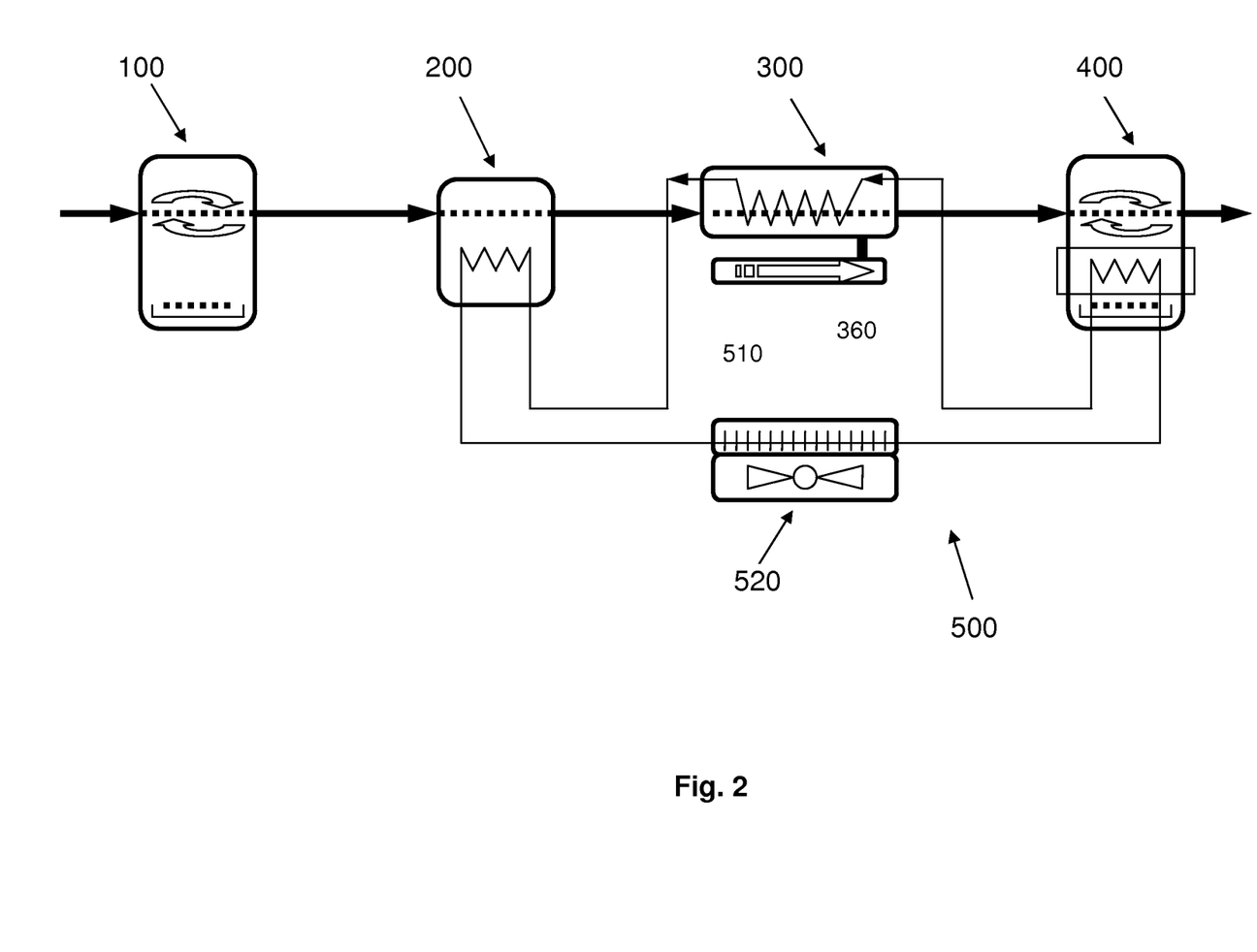
FIG. 2 shows a schematic of a first embodiment of the present invention.

FIG. 2 shows a view of a compressed air system according to an embodiment of the present invention. The maximum benefit can be obtained from a system including each of the components shown but an improvement over the prior art can be achieved by using any one or more of the individual components. The following description therefore addresses each component which is to be considered an aspect of the invention in its own right.

The first component 100 is a filter and drier. It serves to provide the system with clean air, from which some, but not all, moisture has been removed. It takes its air input from an exposed surface of the vehicle. Ideally, the air input will be taken from a point facing forwards, but this is not always possible. The next best source of air then is from a point adjacent the centre of the road (i.e. usually on the driver's side of the vehicle), rather then from the side nearest the gutter, where debris and standing water are often found. In any event, the pipe connecting the air inlet to the compressor should be as short as possible so as to have a low resistance to airflow. Also, the air should be drawn from a location that is as close to ambient temperature as possible.

Filter 100 is essentially identical in its means of operation to filter 400 which is positioned at the output of the process, but with a size appropriate to the volume flow rate of working fluid at a lower pressure than in filter 400. However, filter 400 and can also include an additional cooling jacket, which is omitted from filter 100. However, the operation of filter 100 is identical to the filter 400 shown in detail in FIGS. 3a-c, with the exception of the water jacket and the changes in the sizing of the unit.

Figure 3A:
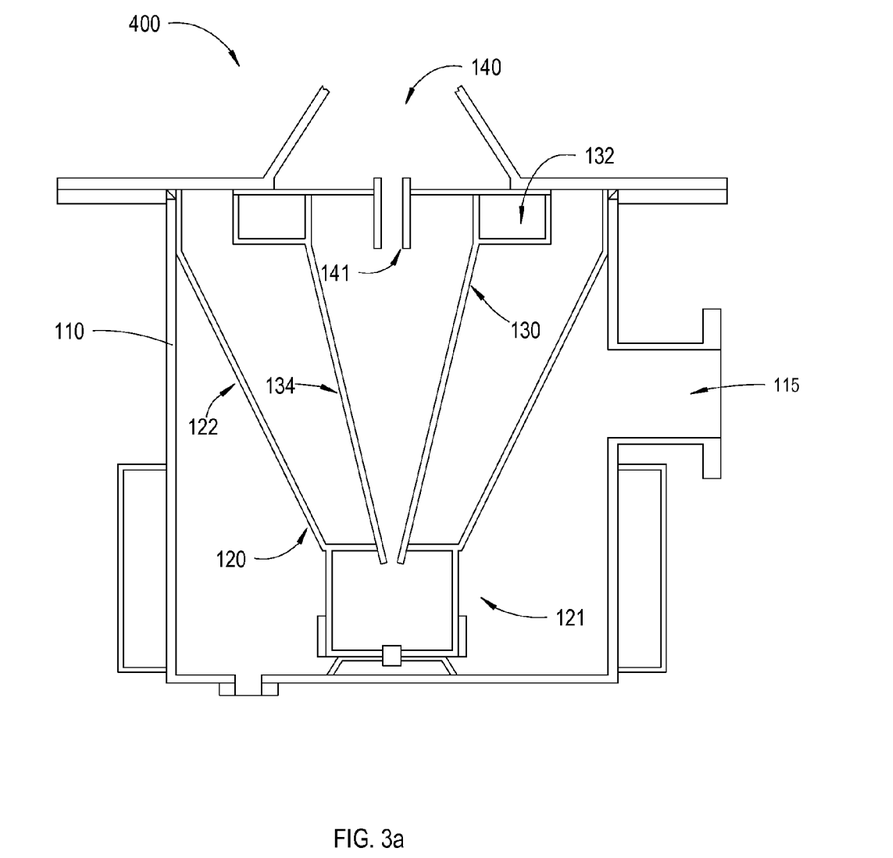
FIGS. 3a-c show various sectional views of a filter according to a second embodiment of the present invention.
Figure 3B:
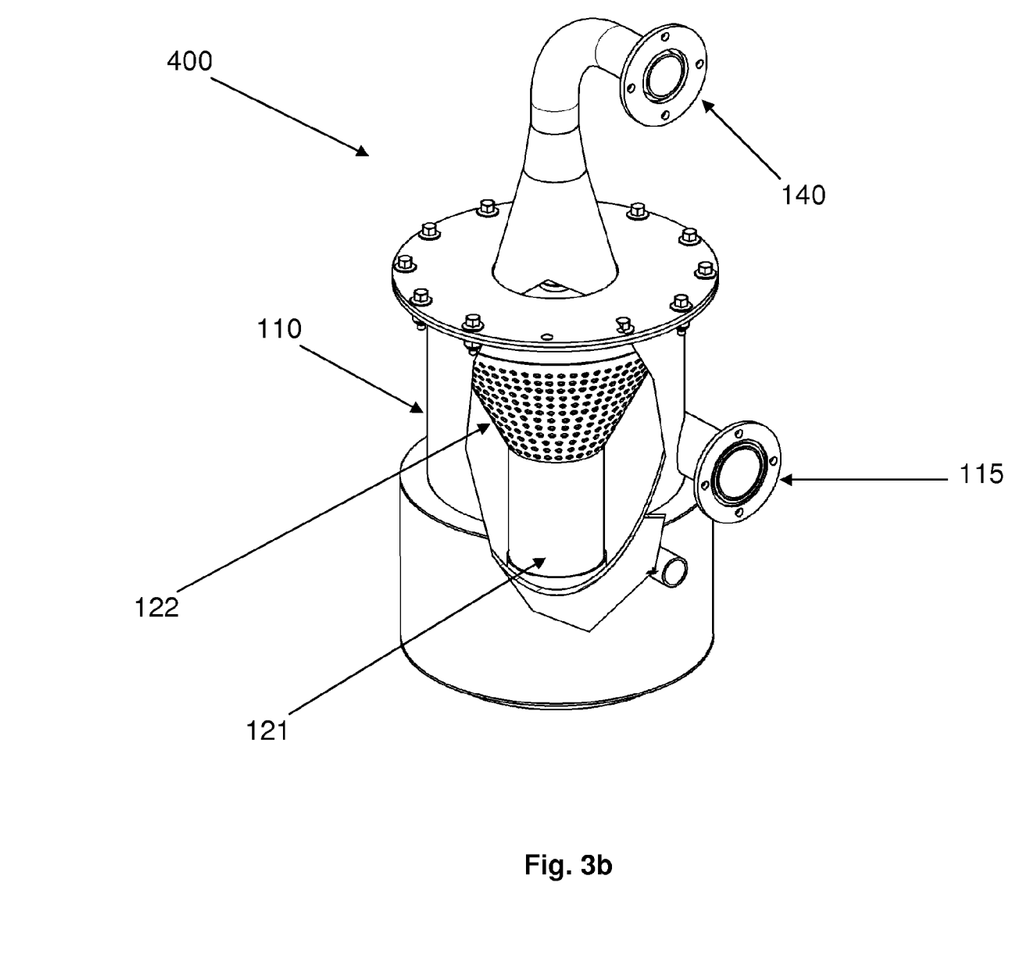
Figure 3C:
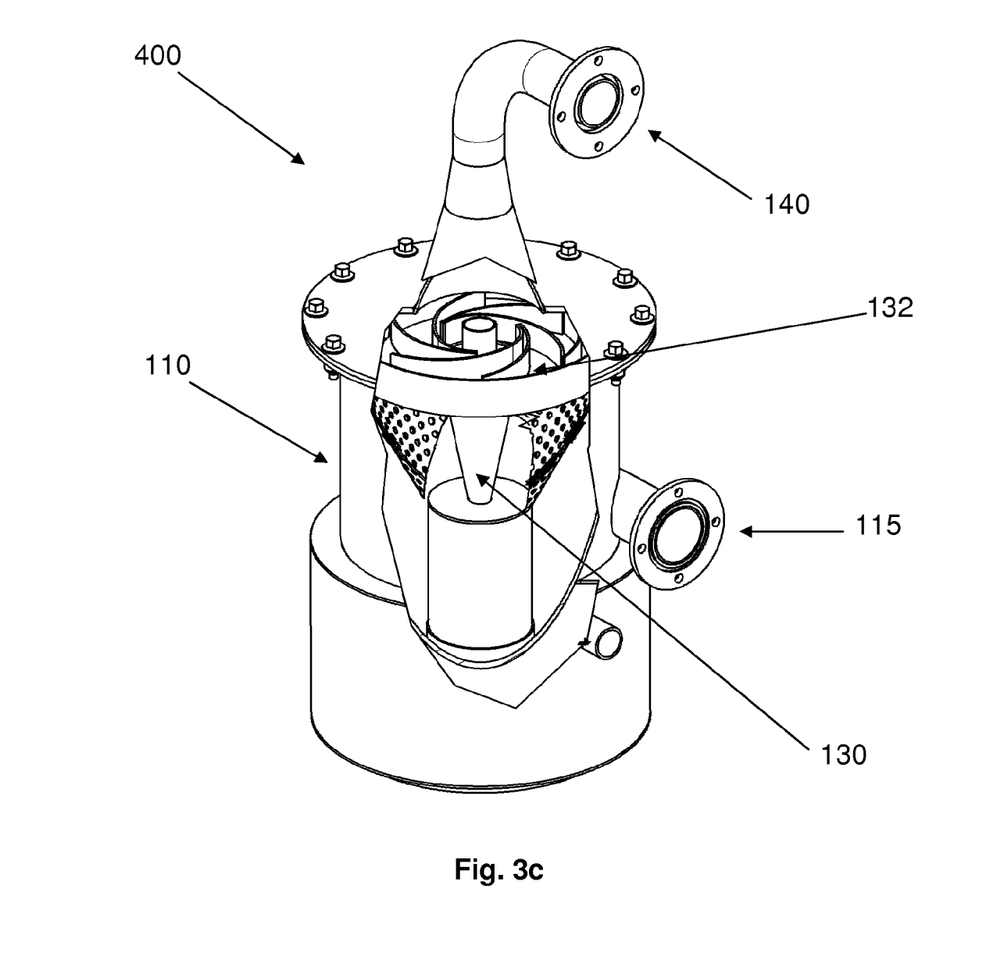

The filter 400 is shown in various cross-sectional views in FIGS. 3a-c and comprises a generally cylindrical drum or canister 110. Air is drawn into the drum 110 from inlet 115, located approximately half-way up the length of an external surface. The inlet 115 is offset so that it directs air substantially tangentially to the perimeter of the drum. This is so that incoming air is forced to spin around the internal surface of the drum 110. It should be noted that the outlet 140 of the drum, is connected to the input of the compressor, which has the effect of drawing air through the filter 100.

Once the air enters the drum 110 and begins spinning, centripetal effects cause larger items of debris and small droplets of water or other liquids or mist to be thrown outwards where gravity causes them to fall to the bottom of the drum for later disposal, which is described shortly.

Located within the drum are two generally conical members 120, 130. The first one 120 to be encountered by the spiralling air is terminated at its rear by cylindrical portion 121 which then tapers outwards to meet the internal surface of drum 110. The tapered section is perforated to allow the passage of air. The spiralling air, which is drawn towards the output 140, passes up through the perforated section, having discharged some debris and some water. Once the air has passed through the perforated portion 122 of first conical member 120, it encounters an inlet port 132 of second conical member 130.

Figure 4:
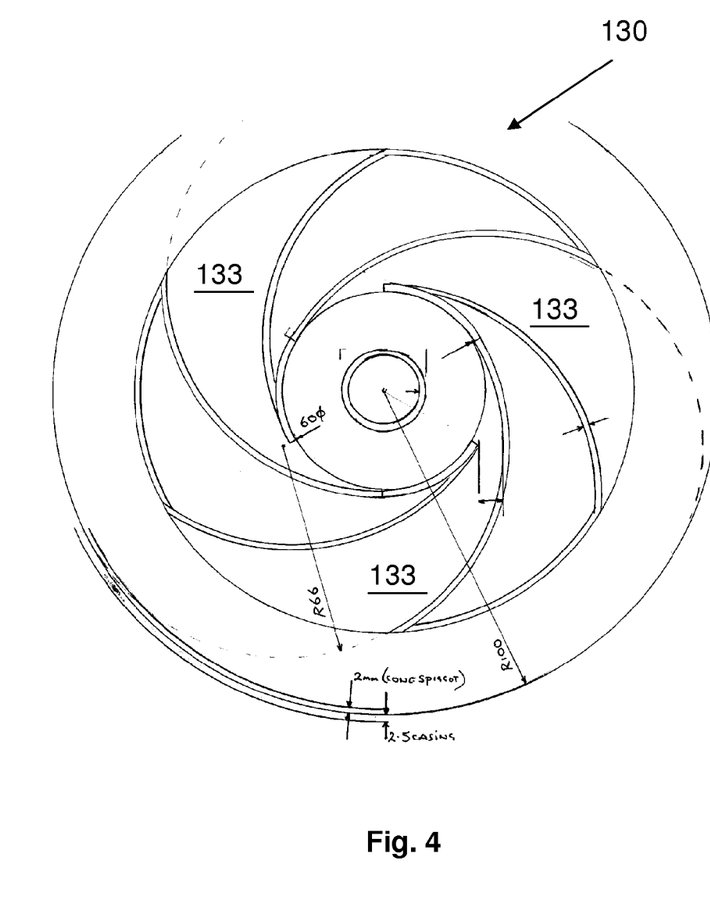
FIG. 4 shows an inlet portion of a part of a filter according to an embodiment of the invention.

The second conical member 130 sits inside the first conical member 120. Its lower, thinnest, portion extends and opens into the cylindrical portion 121 of the first conical member. Its widest portion comprises an inlet port 132. The inlet port 132 comprises a plurality of ducts 133 which direct the air downwards and into the tapered section 134 of the second conical member 130. FIG. 4 shows a cross-sectional plan view of the inlet port 132, showing how the three ducts 133 are configured to direct the air towards the centre of the tapered section 134.

Once the air enters the tapered section, its velocity increases, due to the smaller diameter of the second conical member 130. As the air progresses down the tapered section, and the diameter decreases still further, increasing the velocity accordingly, more moisture and debris is removed, which falls, under gravity, into the cylindrical section. During the process of acceleration of the airstream at any point in the filter drier, pressure and temperature both fall causing a tendency for condensation to form, which droplets are centrifuged out.

The cylindrical section has an open lower portion, allowing the debris and moisture to fall to the floor of the canister 110.

All the time, air is being drawn by the flow towards the compressor and towards the outlet port 140. This has the effect, that when the spiralling vortex of air reaches the open, narrow, end of tapered section 134, that a column of air is drawn up towards the outlet port 140. One of the features of a spinning volume of air is that the space about which it spins is calm (e.g. the eye of a hurricane), and this allows a two entirely different formations of air to exist in the same physical space.

The column of air that passes through the spinning volume of air rises to the exit port 140 and on to the compressor. The exit port 140 comprises an extended portion 141 which protrudes towards the tapered section 134. This has the purposes of ensuring that air that enters the second conical member 130 does not immediately enter the exit port.

The volume of the filter 100 is arranged to act as an air-box, and so provide a reasonable volume of air to the compressor. By matching, or approximating, the volume of the first filter 100 with the second, later, filter, 400, it is found that volumetric efficiency in increased, which allows the compressor to 'breathe' better, reducing pulsing currents of air and the problems which they cause, which have been discussed previously.

Air from the outlet 140 of the filter 100 next passes to the compressor 200. The compressor is a standard compressor and is not radically different to compressors of the prior art. However, to improve the performance of the compressor, it is found that providing the compressor 200 with its own lubrication system, rather than sharing it with the engine, can result in better performance. In particular, less oil is drawn into the compressed air system, which contributes to removing a particular problem experienced in the prior art.

The compressor 200 is cooled by cooling system 500, which is described in more detail later.

Air from the compressor is hotter than air entering the compressor, as discussed previously. In an attempt to reduce the aforementioned problems encountered with raised temperatures, the output of the compressor is connected to a heat exchanger 300, which acts to cool the compressed air.

Figure 5:
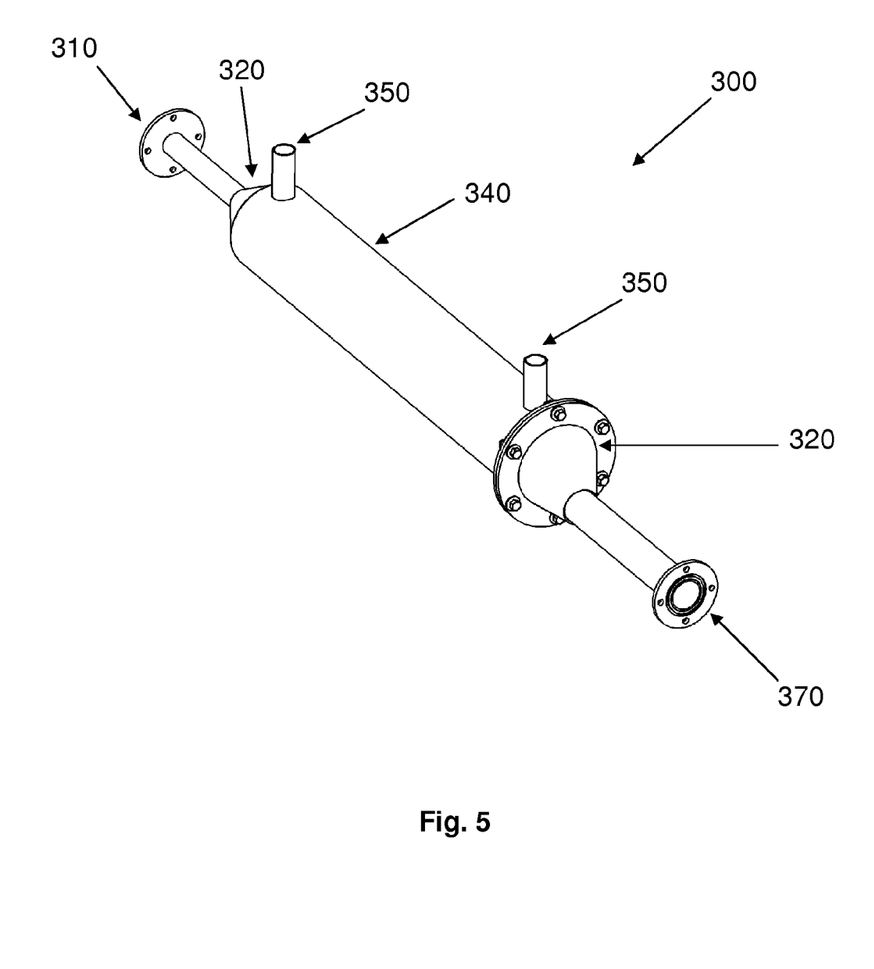
FIG. 5 shows a perspective view of a heat exchanger according to an embodiment of the present invention.
Figure 6:
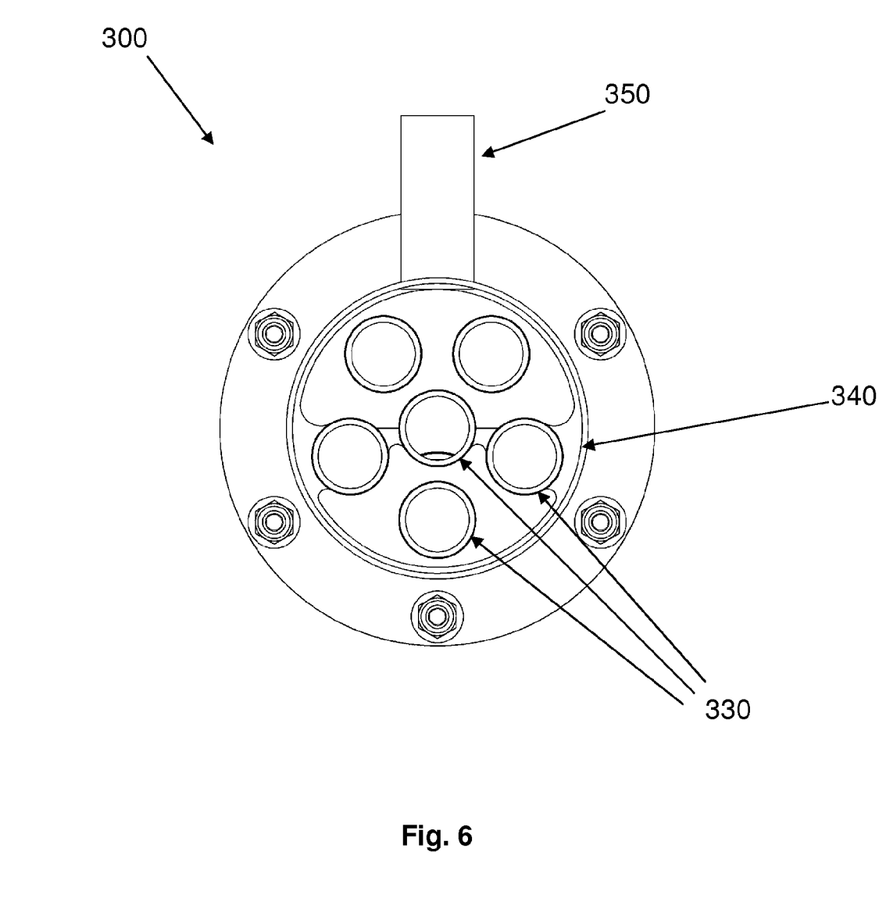
FIG. 6 shows a cross-section through the heat exchanger of FIG. 5.

The heat exchanger 300 is shown in perspective view in FIG. 5, and cross-sectional view in FIG. 6. Air from the compressor enters the inlet 310 from where it passes into a conical portion 320. Upon entering the conical portion, the air expands, which has the effect of cooling it. Connected to the conical portion 320 are a plurality of parallel tubes 330, which are housed within a single larger tube 340. The plurality of tubes 330 run for a length and then connect to a further conical portion 320, which tapers towards the outlet 370. The air then passes onto a further filter 400.

The plurality of tubes 330 within the larger tube 340 are surrounded by coolant, which is circulated through the larger tube via coolant ports 350. The twin processes of allowing the compressed air to expand into the first conical portion 320 and then the plurality of tubes 330, combined with the application of external cooling to the plurality of pipes serves to counteract the increase in the temperature of the air following compression.

The heat exchanger utilises two different processes to cool the compressed air. The first is expansion condensation, whereby the expansion of the air into the conical section 320 and plurality of tubes 330 causes moisture in the air to condense out. The second process is surface condensation whereby contact with the cooled tubes causes moisture to condense out.

The cooling system 500 comprises a closed circuit for conveying a coolant to the components requiring cooling. In FIG. 2, it can be seen that the cooling circuit is used to cool the compressor 200, the heat exchanger 300 and the final filter 400. The coolant is pumped around its circuit via a radiator 510 and is cooled by a fan 520 in the same manner as the cooling system in many vehicles. The coolant can be any coolant mix known from the prior art e.g. water and ethylene glycol.

Alternatively, if the vehicle is supplied with an air conditioning system, this may be used to cool the various components of the compressed air system. Other cooling systems are possible and the exact manner form of the cooling system is not critical to the operation of the system.

A further feature of the heat exchanger is the presence of a Helmholtz resonator 360. This is shown connected to the heat exchanger 300 and is a separate volume of air connected to the input of the heat exchanger. It is an otherwise closed volume and the air does not flow through it. It acts to tune the heat exchanger and helps to reduce the resonant pulsing effect which is observed in prior art compressed air systems. By a process of design and refined by testing, it is possible to determine the optimum volume of the resonator to eliminate or at least reduce the undesirable pulsing effect. The volume is dependent on the configuration of the entire system and so, once determined for a given system layout, it can be fixed.

In a further enhancement, the volume associated with the resonator for a given system can be accommodated within the body of the heat exchanger itself and by selection of the length and volume of the plurality of pipes 330, the benefits of pulsing reduction or elimination can be experienced without providing a separate structure.

When the compressed air leaves the heat exchanger, it is approaching the same temperature as the ambient air drawn into the filter 100, due to the cooling effect of the heat exchanger 300, although the temperature may be maintained above ambient levels to ensure the correct operation of any desiccant-based (or other type of) dryer, which required inlet air to be at a temperature above ambient (typically 25° C., but other temperatures are possible).

The next and final stage is the filter 400. This is essentially identical to the first filter 100 and operates in the same manner, so details of its operation are omitted for brevity. The purpose of this filter is to finally remove any remaining debris in the airstream and to extract any water and any other condensate which may still be present.

The canister is provided with a valve whereby once the pressure or level of contaminants rise to a given value or level, the valve operates, purging the debris and moisture from the canister. This may be an automated process, ensuring that unwanted components of the compressed air stream are periodically ejected from the system, but a manual operation would also be suitable In a further enhancement, the filter 400 is also cooled by the cooling system 500. This is achieved by providing a cooling jacket 410 surrounding at least part of the cylinder. The coolant flows through the cooling jacket and cools the compressed air in the filter 400.

Alternatively, a cooling coil or other means provided internal to the cylinder may be used instead of the cooling jacket.

An optional further air drier, using, for example, a desiccant, can be provided after the filter 400 depending on the exact requirements of the system. This may be necessary in particularly humid climates where it may not be possible to remove sufficient moisture from the air by means of filters 100 and 400. Other forms of known air drier can be used.

By provision of a compressed air system as described, it is possible to approach an isothermal process i.e. the temperature of air leaving the system is the same or nearly the same as air entering the system but the pressure is raised above ambient to provide the stored energy required to operate a compressed air system. This addresses many of the problems encountered in the prior art and helps to alleviate problems associated with back pressure, pulsing of the airstream, combustion in the pipework, and in extreme cases, catastrophic failure of parts of the system which can pose fire risks.

Components of the system are manufactured from stainless steel or other suitable metals or alloys. Other suitable materials, known to the skilled person, can be used instead or as well.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A filter for filtering a working fluid comprising:
    a canister having an inlet and an outlet connected to an apparatus operable to supply compressed air to an air-powered system in a vehicle;
    a first partially perforated generally conical member positioned in said canister;
    a second generally conical member positioned inside said first partially perforated generally conical member, whereby the working fluid upon entering the inlet is caused to spin inside the canister, to pass through a perforated portion of the first generally conical member, to enter an inlet to the second generally conical member, to spin within the second conical member and to pass through the outlet, characterized in that the filter is cooled by a coolant.

2. The filter as claimed in claim 1 wherein the inlet to the canister is located such that the working fluid enters the canister tangentially, causing the working fluid to spin.

3. The filter as claimed in claim 1 wherein the first generally conical member comprises a cylinder at a narrow end thereof.

4. The filter as claimed in claim 3 wherein the narrow end of the second generally conical member is positioned inside the cylinder.

5. The filter as claimed in claim 1 wherein the inlet to the second generally conical member comprises a plurality of ducts.

6. The filter as claimed in claim 1 wherein the outlet of the canister comprises an element which extends into the second generally conical member such that working fluid entering the second generally conical member is not able to exit through the outlet immediately.

7. The filter as claimed in claim 1 wherein the canister is provided with a pressure valve whereby debris is purged periodically, once a given pressure is reached.

8. The filter as claimed in claim 1 wherein the coolant is provided in a coolant jacket which surrounds at least part of the canister.

\* \* \* \* \*